Patented Aug. 26, 1952

2,608,583

UNITED STATES PATENT OFFICE 2,608,583

METHOD FOR STEREO-CHEMICAL EQUILIBRATION OF SECONDARY CARBINAMINES

Thomas Carl Aschner, Philadelphia, Pa., assignor to Smith, Kline & French Laboratories, Philadelphia, Pa., a corporation of Pennsylvania No Drawing. Application August 31, 1949, Serial No. 113,487

6 Claims. (Cl. 260—570.8)

This invention relates to a method for the stereochemical equilibration of optical isomers of secondary carbinamines, that is to say compounds where the nitrogen linked carbon atom is a center of asymmetry.

It will be understood that the term "equlibration" as used herein will connote partial or complete interconversion of spacial arrangement of the substituents of a secondary carbon atom linked to a nitrogen atom. The method in accordance with this invention will be useful for effecting partial or complete racemization of optical isomers, including both enantiomorphs and diastereoisomers, and partial or complete interconversion of geometrical isomers, where in such isomers the spacial arrangement of the nitrogen atom and the hydrogen atom around a secondary carbon atom is in part or completely responsible for the isomerism of the molecule.

Thus, by way of exemplification, the method according to this invention is applicable to the partial or complete racemization of optical isomers of primary and secondary amines in which the amino group is linked to at least one secondary asymmetric carbon atom, and Schiff's bases (N-substituted aldimines or ketimines) in which the nitrogen is linked by a single bond to an asymmetric secondary carbon atom; and primary or secondary amines in which the nitrogen is linked to a secondary carbon atom which is part of a ring system and which are susceptible of existing in cis and trans isomers, may be interconverted.

Reference may be had to an article by Doering & Aschner appearing in Journal of the American Chemical Society, 71, 838, dated March 1949, for further explanation of the term "equilibration" as used herein.

By way of example, the method in accordance with this invention is applicable to optically active secondary carbinamines having the structure:

wherein
Y is a nitrogen-containing radical, of which the nitrogen is the linking atom to the carbon atom, selected from the group consisting of amino, monosubstituted amino and imino radicals.

The nitrogen linked carbon atom is a center of asymmetry.

R and R' are unlike and selected from the group consisting of alkyl, aryl, substituted aryl, aralkyl, substituted aralkyl, aralkanol, substituted aralkanol, isocyclic, heterocylic, isocycloalkyl, heterocycloalkyl radicals and the remainder of a ring system of which the nitrogen linked carbon is a member.

More specifically, the method according to this invention is applicable to secondary carbinamines having the following structure:

wherein
Y is a nitrogen containing radical, of which the nitrogen is the linking atom to the carbon atom, selected from the group consisting of amino, monoalkylamino having not more than 8 carbon atoms, phenylalkylamino having not more than 10 carbon atoms and an imino radical having not more than 10 carbon atoms; the nitrogen linked carbon atom is a center of asymmetry; and R and R' are unlike and selected from the group consisting of alkyl having not more than 8 carbon atoms, cycloalkyl having 5–8 carbon atoms, phenyl, phenylalkyl, the alkyl portion of which has not more than 8 carbon atoms, all of which groups may contain substitutents selected from the group consisting of alkyl having not more than 8 carbon atoms, cycloalkyl having not more than 6 carbon atoms, alkoxy having not more than 8 carbon atoms, hydroxy and alkylamino having not more than 8 carbon atoms.

By way of further illustration of the applicability of the method according to this invention, the method will be found applicable for the equilibration of, for example, stereo isomers of the following compounds:

1-phenyl-1-hydroxy-2-methylaminopropane
1-phenyl-2-aminopropane
1-phenyl-2-methylaminopropane
1-(p-methylphenyl)-2-aminopropane
1-phenyl-1-aminoethane
1-phenyl-1-ethylaminoethane
1-cyclohexyl-2-aminopropane
1-cyclohexyl-2-methylaminopropane
2-amino-6-methylheptane
2-methylamino-6-methylheptane
N-(beta-phenylisopropyl)-beta-phenylisopropylketimine
Cis-1-amino-2-methylcyclohexane
1-amino-phenyl-ethane Generally speaking, the method in accordance with this invention involves the treatment of optically active secondary carbinamines of the type indicated to reversibly establish a double bond between the asymmetric secondary carbon atom and the adjacent nitrogen atom. Upon establishing such a double bond, the carbon and nitrogen atoms, it is believed, become coplanar and the original, specific spacial arrangement of substituents around the secondary carbon atom is thereby destroyed. Having established such a double bond, a single bond is reestablished between the secondary carbon atom and the adjacent nitrogen by the addition of hydrogen to the carbon atom.

The hydrogen atom may add to the secondary carbon atom in either of two possible spacial positions, thus giving rise to two stereoisomers in various proportions. The precise proportion will depend upon the particular compounds treated.

Thus, it is believed that the method in accordance with this invention involves effecting a completely or partially reversible hydrogen transfer between a carbon-to-nitrogen single bond and a carbon-to-nitrogen double bond either intramolecularly or intermolecularly, depending upon the starting compounds used and upon the conditions of treatment.

More specifically, the method in accordance with this invention involves equilibrating optically active secondary carbinamines of the type indicated by heating at about atmospheric, or greater, pressure, either in a batch or a continuous flow system, with a hydrogenation or dehydrogenation catalyst, such as, for example, nickel, palladium, platinum, cobalt, Raney nickel, or other hydrogenation catalyst known to the art. It is to be particularly noted that other hydrogenation or dehydrogenation catalysts, as a class, may be utilized for equilibration of carbinamines according to the method of this invention with equal applicability to those specifically disclosed herein. Thus, this invention is not to be considered as being limited to utilization of only those catalysts mentioned.

Proceeding in accordance with the method various temperatures may be used, depending upon the particular catalyst and the particular compound treated. Generally speaking a temperature within the range 100° C.–300° C. will be effective using a nickel catalyst.

It is believed that reactions by which the hydrogen transfer indicated above may take place will be illustrated by the following:

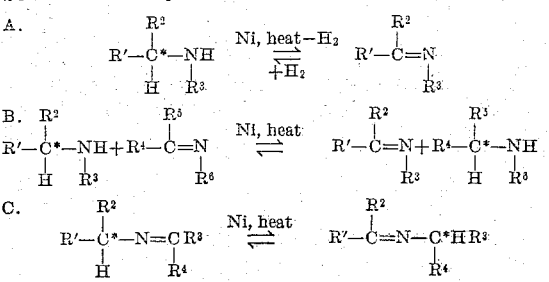

In the above reactions it will be understood that $R^1$–$R^6$ will be as given above for R and R' in connection with the general formula and that the nitrogen linked carbon is a center of asymmetry.

In the treatment a solvent will be used where the compound to be treated is not liquid at the temperature employed. Where the compound to be treated is a liquid, the use of solvent is not necessary. Variously, it will be advantageous to proceed with the treatment in an atmosphere of inert gas, for example, nitrogen, ammonia gas, or the like.

Variously the initial addition of small amounts of an imine such as produced in the reaction A above may be found to be advantageous, although generally not necessary inasmuch as an amine of the general formula above may be slowly dehydrogenated to the imine by the procedure suggested in reaction A above.

The following examples of procedure according to the method of this invention for the equilibration of specific compounds will make apparent the general applicability of the method for the equilibration of secondary carbinamines of the types indicated.

EXAMPLE 1

*Racemization of l-2-amino-6-methylheptane*

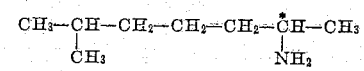

20 gms. of l-2-amino-6-methyl-heptane possessing an optical rotation $a_D^{25} = +0.3$ was heated in the presence of 2 gms. of nickel pellets at a temperature of 140° C. for four hours to yield, upon decantation, of the reaction mixture from the catalyst and subsequent fractionation, a 2-amino-6-methylheptane fraction of a substantially decreased rotation.

Following the above procedure the following compounds will be equilibrated:

(a) d or l-2-amino-6-methylheptane
(b) l-2-aminobutane
(c) d-2-aminodecane
(d) d or l-2-amino-5-dimethylaminopentane

EXAMPLE 2

*Racemization of d-l-cyclohexyl-2-methylaminopropane*

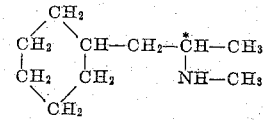

30 gms. of d-l-cyclohexyl-2-methylaminopropane possessing an optical rotation $a_D^{25} = +23.4$ was heated in the presence of 10 gms. of nickel pellets at a temperature of 160° C. for five hours to yield, upon decantation of the reaction mixture from the catalyst and subsequent fractionation, a l-cyclohexyl-2-methylaminopropane fraction of an $a_D^{25}$ of +13.1.

Proceeding as above d or l-1-cyclohexyl-2-amino-2-(4-methylcyclohexyl)ethane will be equilibrated.

EXAMPLE 3

*Racemization of dextro-phenylisopropylamine*

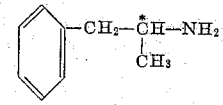

The dextro-rotatory optical isomer of phenylisopropylamine may be racemized to a mixture of the levo and dextro rotatory isomers by the method disclosed in this invention. According to this method, 100 grams of the dextro isomer are treated with 5 grams of Raney nickel catalyst at a temperature of 150° C. for a period of six hours. The reaction is carried out in an atmosphere of nitrogen gas at 1.1 atmospheres of pressure.

Upon decantation of the residual liquid and fractionation thereof, there is recovered phenylisopropylamine showing only 8% of its original optical activity, in good yield.

Proceeding as above d or 1-1-(p-methylphenyl)-1-amino-2-(p-methoxyphenyl)ethane will be equilibrated.

EXAMPLE 4

*Racemization of levo-phenylisopropylamine*

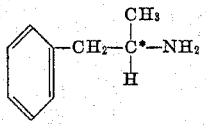

The racemization of the levo isomer of phenylisopropylamine to a dl mixture will be accomplished by a procedure identical with that in Example 3 except that an equivalent amount of l-phenylisopropylamine will be used in place of the dextro isomer.

It may also be accomplished through utilization of a continuous flow system by which 1,000 grams of l-phenylisopropylamine are passed through a catalytic chamber in which is contained 100 grams of nickel on kieselguhr pellets maintained at a temperature of 135° C. over a period of 3½ hours at atmospheric pressure. Fractionation of the resulting liquid phase from this operation yielded phenylisopropylamine showing 12% of its original optical activity.

EXAMPLE 5

*Racemization of dextro-phenylisopropylmethylamine*

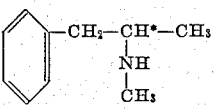

The dextro rotatory isomer of phenylisopropylmethylamine will be racemized to a d,l mixture by the method disclosed in this invention. According to this method 100 grams of d-phenyl-isopropylmethylamine are treated with 10 grams of the catalytic material comprising nickel on kieselguhr which is maintained at a temperature of 145° C. The reaction may be carried out at atmospheric pressure and over a period of 10 hours.

Upon fractionation of the liquid decanted from the reaction mixture there is obtained in good yield phenylisopropylmethylamine having only 15% of the original optical activity.

Proceeding as above d or 1-1-(p-methylphenyl)-2-methylaminopropane ethane will be equilibrated.

EXAMPLE 6

*Racemization of d-N-(β'-phenylisopropyl)-β-phenylisopropylidenimine*

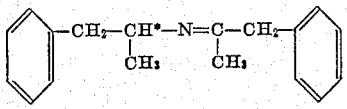

The dextro isomer of N-(β'-phenylisopropyl)-β-phenylisopropyl ketimine may be prepared by reacting dextro-β-phenylisopropyl amine with an equimolar quantity of β-phenylacetone by a method known to the art.

The resultant dextro rotatory ketimine will be racemized by the method according to this invention in which 100 grams of the dextro isomer is heated with 10 grams of nickel on kieselguhr pellets at 155° C. temperature for a period of 5 hours. There is obtained upon fractionation of the decanted reaction mixture the N-(β'-phenyl isopropyl)-β-phenyl isopropyl ketimine in excellent yield, possessing only a fraction of its original optical activity.

Acid hydrolysis of the resulting ketimine permits one to obtain phenylisopropylamine exhibiting a correspondingly low degree of optical rotation.

What is claimed is:

1. The method of equilibrating a secondary carbinamine having the structure:

wherein Y is a nitrogen containing radical, of which the nitrogen is the linking atom to the carbon atom, selected from the group consisting of amino, monoalkylamino, phenylalkylamino and an imino radical; the nitrogen linked carbon atom is a center of asymmetry; and R and R' are unlike and selected from the group consisting of alkyl, cycloalkyl, phenyl, phenylalkyl, which comprises heating a secondary carbinamine having said structure in the presence of a catalyst selected from the group consisting of nickel, Raney nickel, palladium, platinum and cobalt.

2. The method of equilibrating an optical isomer of 1-phenyl-2-aminopropane which comprises heating an optical isomer of 1-phenyl-2-aminopropane in the presence of a catalyst selected from the group consisting of nickel, Raney nickel, palladium, platinum and cobalt.

3. The method of equilibrating an optical isomer of 1-phenyl-2-methylaminopropane which comprises heating an optical isomer of 1-phenyl-2-methylaminopropane in the presence of a catalyst selected from the group consisting of nickel, Raney nickel, palladium, platinum and cobalt.

4. The method of equilibrating an optical isomer of β(p-methylphenyl)-2-aminopropane which comprises heating an optical isomer of β-(p-methylphenyl)-2-aminopropane in the presence of a catalyst selected from the group consisting of nickel, Raney nickel, palladium, platinum and cobalt.

5. The method of equilibrating an optical isomer of 1-2-amino-6-methylheptane which comprises heating an optical isomer of 1-2-amino-6-methylheptane in the presence of a catalyst selected from the group consisting of nickel, Raney nickel, palladium, platinum and cobalt.

6. The method of equilibrating an optical isomer of d-1-cyclohexyl-2-methylaminopropane which comprises heating an optical isomer of d-1-cyclohexyl-2-methylaminopropane in the presence of a catalyst selected from the group consisting of nickel, Raney nickel, palladium, platinum and cobalt.

THOMAS CARL ASCHNER.

No references cited.